(12) United States Patent
Hooker et al.

(10) Patent No.: US 7,594,114 B2
(45) Date of Patent: Sep. 22, 2009

(54) AUTHENTICATION APPARATUS AND METHOD FOR UNIVERSAL APPLIANCE COMMUNICATION CONTROLLER

(75) Inventors: John Kenneth Hooker, Lousville, KY (US); Eric Larouche, Lévis (CA)

(73) Assignee: General Electric Company, Schenectady, NY (US)

( * ) Notice: Subject to any disclaimer, the term of this patent is extended or adjusted under 35 U.S.C. 154(b) by 741 days.

(21) Appl. No.: 10/244,643

(22) Filed: Sep. 16, 2002

(65) Prior Publication Data

US 2004/0064699 A1      Apr. 1, 2004

(51) Int. Cl.
*H04L 9/00*      (2006.01)
(52) U.S. Cl. ..................................... 713/170
(58) Field of Classification Search .............. 713/170, 713/168; 709/228, 230; 380/30, 262
See application file for complete search history.

(56) References Cited

U.S. PATENT DOCUMENTS

| | | | |
|---|---|---|---|
| 4,349,695 A * | 9/1982 | Morgan et al. ............... 713/170 |
| 4,665,544 A | 5/1987 | Honda et al. |
| 4,829,560 A | 5/1989 | Evanyk et al. |
| 5,268,811 A | 12/1993 | Maeda |
| 5,460,006 A | 10/1995 | Torimitsu |
| 5,481,611 A * | 1/1996 | Owens et al. ............... 713/159 |
| 5,629,898 A | 5/1997 | Idei et al. |
| 5,790,669 A * | 8/1998 | Miller et al. ................. 713/177 |
| 5,815,086 A | 9/1998 | Ivie et al. |
| 5,877,957 A | 3/1999 | Bennett |
| 5,909,183 A | 6/1999 | Borgstahl et al. |
| 5,956,487 A | 9/1999 | Venkatraman et al. |
| 6,003,070 A | 12/1999 | Frantz |
| 6,034,618 A * | 3/2000 | Tatebayashi et al. ........ 713/169 |
| 6,112,127 A | 8/2000 | Bennett |
| 6,218,931 B1 | 4/2001 | Asghar et al. |
| 6,256,378 B1 | 7/2001 | Iggulden et al. |
| 6,275,166 B1 | 8/2001 | del Castillo et al. |
| 6,493,825 B1 * | 12/2002 | Blumenau et al. ........... 713/168 |
| 6,757,828 B1 * | 6/2004 | Jaffe et al. .................. 713/176 |
| 2002/0027504 A1 * | 3/2002 | Davis et al. ................. 340/540 |
| 2003/0109938 A1 * | 6/2003 | Daum et al. ................. 700/11 |
| 2004/0044816 A1 * | 3/2004 | Hooker et al. ............... 710/305 |

OTHER PUBLICATIONS

The CEBus Standard User's Guide, Grayson Evans, May 1996, pp. 7-30 to 7-33.

* cited by examiner

*Primary Examiner*—Gilberto Barron, Jr.
*Assistant Examiner*—Hadi Armouche
(74) *Attorney, Agent, or Firm*—George L. Rideout, Esq.; Armstrong Teasdale LLP

(57) ABSTRACT

An authentication algorithm and apparatus for communication between a first device and a second device over a network carrier is provided. The algorithm includes encoding, in response to a message from the second device, a first authentication value upon receipt of the message; sending the encoded value to the second device; decoding, in response to a reply from the second device, a second authentication value upon receipt of the reply; and comparing the first and second authentication values to determine the authenticity of the reply.

13 Claims, 5 Drawing Sheets

AUTHENTICATION APPARATUS AND METHOD FOR UNIVERSAL APPLIANCE COMMUNICATION CONTROLLER

BACKGROUND OF THE INVENTION

This invention relates generally to control methods and apparatus for appliances, and, more particularly, to a universal communications controller for interfacing and networking different appliance platforms.

Modern appliances typically include a number of relatively sophisticated electronic controls to implement advanced product features and to control components of the appliance to meet increasingly demanding energy efficiency requirements and performance objectives.

In typical appliance operation, a number of peripheral devices are interfaced with a main controller of the appliance, and connecting and communicating the peripheral devices to one another and to the main controller is challenging. For example, in a refrigerator, a main controller board may be interfaced with an icemaker, a dispenser system, distributed temperature control displays and human machine interface (HMI) boards, quick chill compartment systems, and the associated fans, motors, and active components of the refrigerator sealed system that force cold air throughout the refrigerator. Each of these peripheral devices may include a separate control board responsive to commands from the main controller. For example, a dispenser board may activate or deactivate water valves, ice delivery components and ice crushers, dispenser lights and indicators, etc. in response to user interaction and/or interactive commands from the main controller, and the fan motors may include control boards for precise control of airflow in the refrigerator, such as by pulse width modulation and the like. Point-to-point wiring of each of these devices can quickly become unmanageable and expensive.

In addition, appliance main and possibly some of the peripheral control boards often include microcontrollers or microprocessors that allow the appliance to be programmed, reprogrammed, or to execute diagnostic tests. The appliance controls are typically customized for a particular appliance, and conventionally the only means of updating the controls was to replace the appliance. Additionally, service and repair operations conventionally require a visit by qualified personnel to the location of the appliance.

Recent networking technologies provide an opportunity to modify, update, reprogram or alter control data and algorithms, to perform diagnostic tests, and to control appliances from remote locations. Thus, for example, an oven may be preheated or a dishwasher started by an online user before leaving the workplace to return home, and service personnel may diagnose and possibly rectify appliance problems through a network connection. To accomplish these and other considerations, meaningful data exchange across networked appliances is required. Given the large number of appliances employing different control boards utilizing different types of data, meaningful data exchange between the control boards and an external network across appliance platforms has yet to be achieved.

Additionally, recent networking technologies present an opportunity for mischievous operation and manipulation of networked appliances by unauthorized users over public networks. For example, dozens of power line carrier communication networks may be established on a common electrical system sharing a single distribution transformer. While "house codes" or "system addresses" may be provided to facilitate different logical networks in the same physical network, such logical networks are vulnerable to malicious hackers.

BRIEF DESCRIPTION OF THE INVENTION

In one aspect, an authentication algorithm for communication between a first device and a second device over a network carrier is provided. The algorithm comprises encoding, in response to a message from the second device, a first authentication value upon receipt of the message; sending the encoded value to the second device; decoding, in response to a reply from the second device, a second authentication value upon receipt of the reply; and comparing the first and second authentication values to determine the authenticity of the reply.

In another aspect, an authentication algorithm for an appliance communication controller in communication with an external host controller is provided. The algorithm comprises encoding a first authentication counter value upon receipt of a first message from the external host controller; sending the encoded counter value to the external host controller; decoding a second authentication counter value upon receipt of a second message from the external host controller; comparing the first and second authentication counter values; responding to the first message if the first and second authentication values match; and ignoring the first message in the first and second authentication values do not match.

In another aspect, an authentication algorithm for an appliance communication controller in communication with an external host controller through a network carrier is provided. The algorithm comprises maintaining an authentication counter value; incrementing the counter value in response to a received message from the external host controller; encoding the incremented authentication counter value with a first encryption key upon receipt of a message from the external host controller; sending the encoded counter value to the external host controller; decoding, with a second encryption key, a reply authentication counter value from the external host controller in response to the sent encoded value if the reply authentication value is received within a predetermined time period; comparing the first and second authentication counter values; responding to the first message if the first and second authentication values match; and ignoring the first message in the first and second authentication values do not match.

In another aspect, a controller comprising a processor, a memory, and a power line carrier transceiver operatively coupled to said processor is provided. The processor is programmed to execute a two-way authentication algorithm utilizing at least a first encryption key and a second encryption key to determine authenticity of messages received by said transceiver.

In another aspect, an appliance communication controller is provided. The controller comprises a processor, a memory, and a transceiver operatively coupled to said processor. The processor is configured to generate an authentication request in response to an incoming message through said transceiver, said authentication request comprising an encoded authentication value; decode an authentication reply received in response to the authentication request; and based upon the decoded reply, to respond to or ignore the incoming message.

In another aspect, an appliance communication controller is provided. The controller comprises a processor, a memory, and a power line carrier transceiver operatively coupled to said processor. The processor is configured to generate an authentication request in response to an incoming message through said transceiver, said authentication request comprising a first encoded authentication counter value encoded with a first encryption key; decode an authentication reply with a second encryption key when said authentication reply is received within a predetermined time period, said authentication reply comprising a second encoded authentication counter value; compare the first counter value with the second counter value; and respond to the incoming message if the first counter value matches the second counter value.

DETAILED DESCRIPTION OF THE INVENTION

Figure 1:
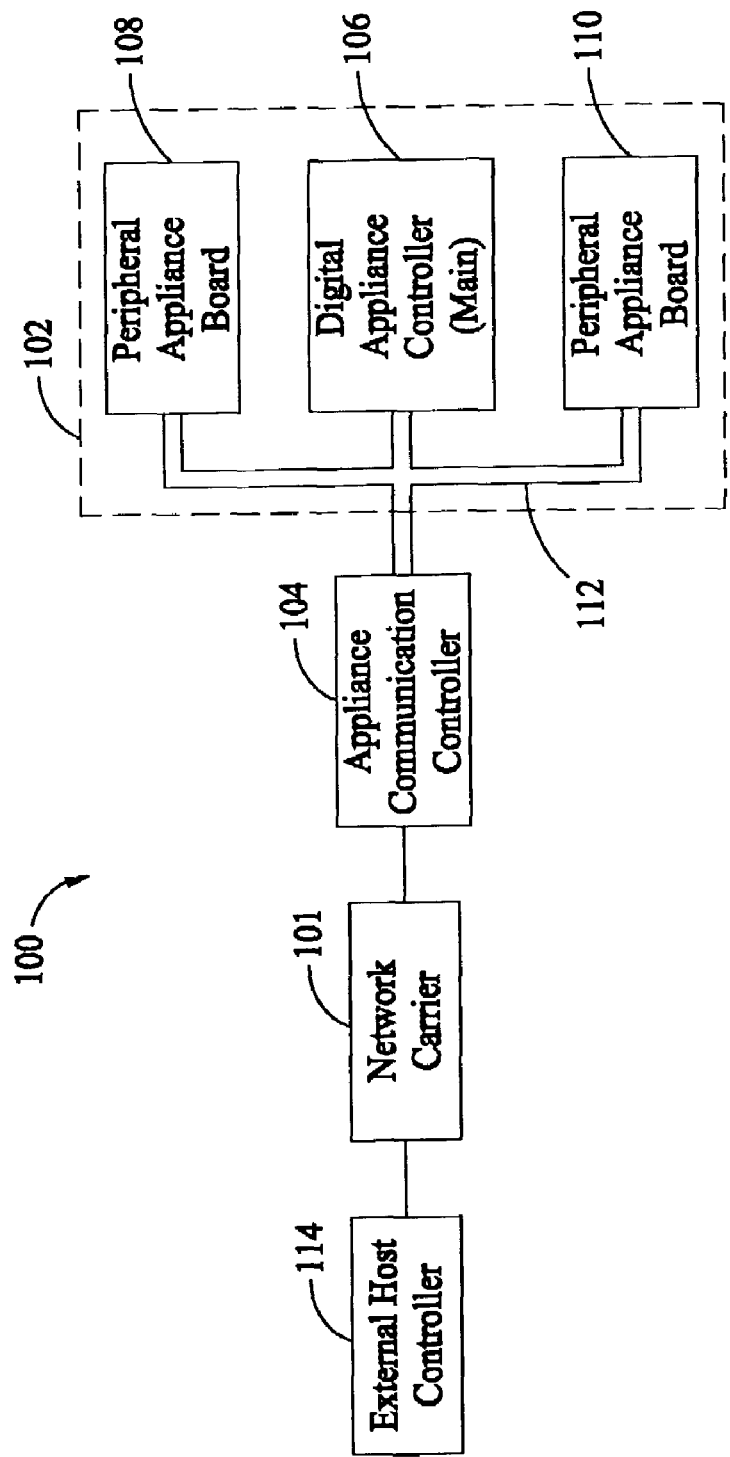
FIG. 1 is a schematic block diagram of an appliance communication system including a universal appliance communication controller.

FIG. 1 illustrates an appliance communication system 100 for interfacing a network carrier 101 to an appliance 102 through an appliance communication controller 104 that provides for bi-directional transmission of data between network carrier 101 and a digital appliance controller 106 of appliance 102. Appliance 102, in various exemplary embodiments, may be a refrigerator, a microwave oven, a convection oven, a stove, a clothes washer, a dryer, a dishwasher, a heating and cooling system appliance, and the like. Appliance 102 includes a main controller 106 communicating with peripheral control boards 108, 110 of peripheral devices through a serial communications bus 112 that facilitates interprocessor communication among the various control boards while simplifying connections between the control boards. Specifically, point-to-point wiring between the main controller and the peripheral devices is rendered unnecessary as each of control boards 106, 108, 110 need only be attached to bus 112 that is extended throughout necessary portions of appliance 102 for control connections. Appliance 102 may therefore be effectively controlled with a reduced numbers of electrical connections.

While appliance 102 is illustrated with two peripheral control boards 108, 110, it is recognized that greater or fewer peripheral control boards may be employed with main controller 106 to operate appliance 102. Therefore, the illustrated control boards 108, 110 are set forth for illustrative purposes only and are not intended to limit the invention to any particular number of control boards. Particulars regarding control boards 106, 108, 110 are believed to within the purview of those in the art and generally beyond the scope of the present invention, so further discussion thereof is omitted.

In an exemplary embodiment, a three wire serial bus 112 having one signal wire and two power/ground wires is, for example, molded or otherwise arranged within a cabinet of appliance 102 to connect the appliance electronics and peripheral devices. Appliance main controller board 106 is coupled to serial bus 112, thereby facilitating communication with peripheral boards 108, 110 and with sensors and transducers (not shown) at all locations where sensory data is required for control of appliance 102, as well as communication with a distributed human-machine interface system including, for example, one or more visual displays (not shown), and one or more input selectors (not shown) for operator manipulation to enter appliance setpoints, activate appliance features, etc. It is contemplated that a serial bus having greater or fewer than three wires may be employed within the scope of the present invention.

Appliance communication controller 104, sometimes referred to as an "ACC", facilitates communication between multiple control boards within an appliance, such as appliance 102, as well as interfaces the appliance with an external network for remote manipulation and data transfer. Control data and algorithms may therefore be revised, updated, modified, or replaced as desired over a network without inconveniencing the appliance owner for a service call and without requiring physical contact with appliance 102. A unique addressing scheme and a control algorithm described below allows appliance communication controller 104 to automatically detect appliances to which it is attached and configure itself for control of that particular appliance. As such, appliance communication controller 104 may be universally used with a wide range of appliances, and application specific controllers and inventories are avoided, thereby simplifying the control scheme.

Data exchange between devices connected to bus 112 is accomplished by a digital serial signal such as via a one, two, or multi wire serial signal link. Each device has a unique digital address allowing appliance main controller 106 to query a status and request information from peripheral devices 108, 110 within appliance 102, and allowing appliances communication controller 104 to query a status, request and transmit information to appliance main controller 106. In operation, each peripheral control board 108, 110 is selectable by appliance controller 106, and appliance controller 106 is selectable by appliance communications controller 104 through respective unique addresses. The address for each control board 106, 108, 110 is part of the connection scheme in distributed bus 112.

Through an external host controller 114, control algorithms and data may transferred to and from main controller 106 of appliance 102. In various embodiments, external host controller 114 is a personal computer, a laptop computer, a remote control operating center, a dedicated service tool, or the like that a remote operator may employ to transmit and receive appliance control data through appliance communication controller 104. Appliance communication controller 104 translates network carrier protocol of carrier 101 and a serial bus protocol, described below, to allow communication between external host controller 114 and main appliance controller 106.

In an exemplary embodiment, network carrier 101 is a power line carrier (PLC) utilizing 120V or 240V AC power lines as a carrier for networking data by modulating the data on a high frequency carrier. Recent PLC technologies, such as CEBus® products in accordance with a CEBus® industry standard developed around a Common Application Language (see EIA standard 721), LonWorks of the Echelon Corporation of San Jose, Calif., and an IT800 Power Line Carrier Transceiver from Itran Communications, Ltd. of Naples, Fla. are commercially available to facilitate adequate data transmission. It is contemplated, however, that other connective mediums, including but not limited to hard wired connections (e.g., RS-232 and Ethernet connections) and wireless technology may also be employed in alternative embodiments while still achieving at least some of the benefits of the instant invention.

In the illustrative embodiment, data is transmitted over a power line by modulating the data on a high frequency carrier above the power line carrier. In one embodiment, the modulated data is a sinusoid wave that is transmitted along with AC power through the power line and associated power lines. The high frequency carrier in one embodiment is between 100 and 400 Hz to keep it below the range of FCC regulation. Such a high frequency carrier may be implemented as an X10 module commercially available from X10 Wireless Technology, Inc. of Seattle, Wash. or as a CEBus power line communication module commercially available from Domosys Corporation of Quebec City, Canada, or the aforementioned IT800 Power Line Carrier Transceiver from Itran Communications, Ltd. of Naples, Fla.

While one appliance 102 is illustrated in FIG. 1, it is appreciated that appliance communication controller 104 may be coupled to more than one appliance 102 for communication of multiple appliances with a remote operator via external host controller 114 and network carrier 101.

Figure 2:
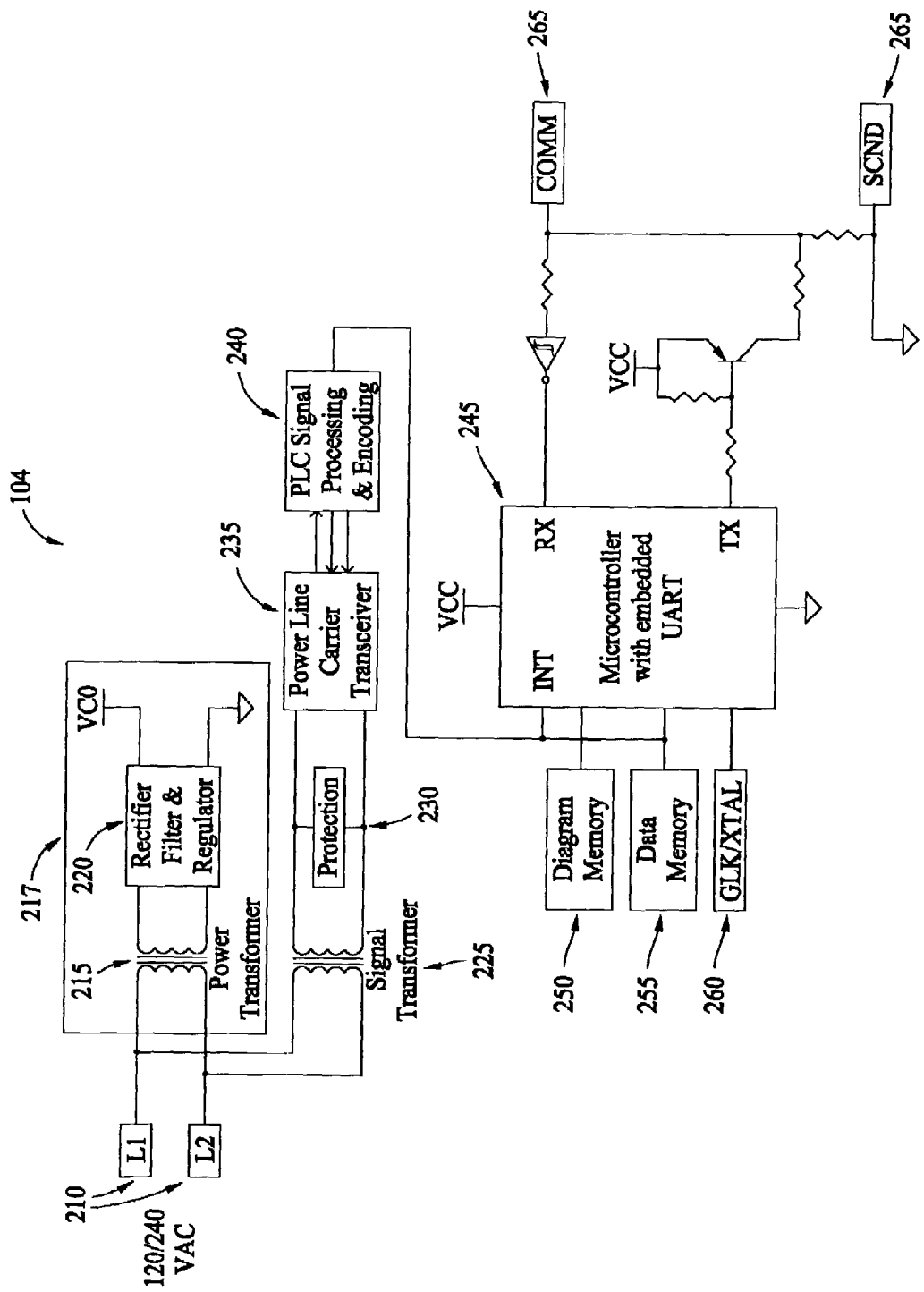
FIG. 2 is a hardware schematic of the appliance communication controller shown in FIG. 1.

FIG. 2 is a hardware schematic of an exemplary appliance communication controller 104 including two connections 210 for 120V of 240V AC power lines, and a transformer based power supply 217. Power supply 217 includes a transformer 215 and a rectifier, filter, and regulator 220. Appliances communication controller 104 also includes a signal transformer 225 and line protector 230, a PLC transceiver 235 and a PLC signal processing and encoding unit 240, sometimes referred to herein as a PLC signal processor. In an exemplary embodiment, appliances communication controller 104 also includes a program memory 250, a data memory 255, and a clock generator 260. Connections 265 of appliances communication controller 104 facilitate connection to appliance 102 (shown in FIG. 1), and in an exemplary embodiment one of connections 265 is a serial signal (COMM) connection and the other connection 265 is a signal ground (SGND) connection.

Transformer 215 may be implemented as a power transformer such as those commercially available from Signal Transformer Co. of Inwood, N.Y. and Tamura Corporation of America in Temecula, Calif. Rectifier, filter and regulator 220 may be implemented in one embodiment with diodes commercially available from Texas Instruments Inc. of Dallas, Tex. or General Semiconductor, Inc.; Panasonic capacitors or Rubicon film capacitors, and a regulator commercially available from Toshiba America Electronic Components of Irvine, Calif. or Micrel Semiconductor of San Jose Calif.

Signal transformer 225 in one embodiment is commercially available from Signal Transformer Co. of Inwood, N.Y. or Vacuumschmelze GMBH & Co. of Hanau, Germany. Line protector 230 in a particular embodiment is a gas tube such as those manufactured by Siemens Corporation of New York, N.Y. PLC transceiver 235 and signal processor 240 may be implemented using PLC integrated circuits manufactured by Royal Philips Electronics of Amsterdam, the Netherlands or the aforementioned IT800 Power Line Carrier Transceiver available from Itran Communications, Ltd of Naples, Fla. In a further exemplary embodiment, communication processor 245 may be implemented as a commercially available microcontroller such as the Hitachi H8S/2134 available from Hitachi Semiconductor (America) Inc. of San Jose, Calif.

Of course, it is understood that the foregoing components are but one collection of components that could be used to implement appliances communication controller 104, and that other known and equivalent components may likewise be employed in alternative embodiments without departing from the scope of the present invention.

PLC connections 210 couple to an AC power line that provides a power line carrier channel. Transformer based power supply 217 includes power transformer 215 and a rectifier, filter and regulator 220 to provide logic level supplies for electronic signal processing and logic. Power supply 217 also electrically isolates electronic signal processing and logic from the AC power line. In alternative embodiments, galvanically isolated power switching supplies or low cost resistive or capacitive dropping power supplies, or low cost resistive or capacitive dropping power supplies may also provide electrical isolation, electronic signal processing and logic from the AC power line.

PLC connections 210 also couple to signal transformer 225, which facilitates a modulated carrier frequency signal from connections 210 to PLC transceiver 235. Line protector 230 electrically isolates the AC line from the rest of the system, and in a particular embodiment is located between signal transformer 225 and PLC transceiver 235. Transmission between PLC transceiver 235 and PLC signal processor 240 is generally bi-directional, but may be unidirectional in certain applications.

PLC signal processor 240 outputs to communication processor 245, which in an exemplary embodiment includes a general purpose universal asynchronous receiver transmitter (UART) that communicates with appliance 102 (shown in FIG. 1) through a communications channel connected through appliance connections 265. UART, in one embodiment, establishes serial bi-directional communication with the appliances communications channel, for example, by changing the transmitter to a high impedance state when not transmitting.

Communications processor 245 is coupled to program memory 250 that stores executable instructions for communications processor 245. Processor 245 is also coupled to data memory 255 that, for example, buffers messages. Program memory 250 and data memory 255 cooperate to buffer messages and to translate between a power line carrier communication protocol and an appliance protocol.

Inter-processor serial communications bus 112 (shown schematically in FIG. 1) is used to communicate between two or more circuit boards, microcontrollers or other devices distributed among one or more appliance platforms, such as between main control board 106 (shown in FIG. 1) and peripheral boards 108, 110 (shown in FIG. 1) and between appliance communication controller 104 and appliance main control board 106. Inter-processor serial communications bus 112 facilitates on demand communications in a multi-master environment. This communication standard does not imply, however, that more than two devices need be present to successfully communicate, nor does it limit a number of devices that can be placed on bus 112 beyond the limits set by the physical addressing scheme.

Because the system architecture has a level of asynchronous activity, the bus architecture is a multi-master environment. The multi-master arrangement allows any device in the system to request information or actions from any other device in the system at any time once they successfully attain control of bus 112 through arbitration.

In one embodiment, a collision detection scheme is employed to determine when a communications port is free or in use and when a collision has occurred on bus 112. A collision occurs when two or more masters attempt to use communications bus 112 at the same time. With respect to appliance communication controller 104, a collision can be detected because the transmit and receive ports on communications processor 245 are connected to the same bus wire Control of the interrupts associated with the communications port allows this to be an interrupt driven activity. Logically, this is a byte-oriented protocol. A higher level software protocol determines the length and content of packets comprising messages.

As will be seen, the serial bus communication protocol includes a physical layer, a data link layer, and an application layer. The physical layer determines an operational state of the bus system, the data link layer defines information communicated on the bus, and the application layer determines system response to communicated information on the bus. The following state table describes a physical layer of the protocol, explained further below.

TABLE 1

Physical Communication Protocol State Table

| State | Action | Result | Next State |
|---|---|---|---|
| 1 | Are there bytes to send? | Yes | 2 |
|   |   | No | 1 |
| 2 | Check bus activity | Busy | 6 |
|   |   | Free | 3 |
| 3 | Send Byte |   | 4 |
| 4 | Does byte sent = byte received? | Yes | 1 |
|   |   | No | 5 |
| 5 | Delay 3 to 8 byte times | Complete | 1 |
| 6 | Delay 5 byte times | Complete | 1 |

In delay states "5" and "6," a byte time is defined as the amount of time required to transmit a single byte on communications bus 112, which is dependent upon and determined by a communications baud rate, number of data bits, number of stop bits, and a parity bit, if used.

The variable delay period shown in state "5" is intended to make the restart delay time random. If a collision does occur, the two bus masters will not delay the same amount of time before retrying transmission, thereby reducing the possibility of subsequent collisions by the two masters. The variable delay period is determined by a known pseudo-random number process, or by a known circuit board function.

The data-link layer defines information moving across bus 112 in any given information packet. The bytes defined in the data-link layer do not necessarily have a one-to-one correlation with the bytes in the physical layer. Many physical devices, such as inter-IC Control ($I^2C$) devices, have bits in the physical layer that implement the functions of some of the bytes in the data-link layer. This data-link layer is intended to be generic so that an application layer of the software will not need to change even if the physical device is redesigned. This layer of the communication system is appropriate for such technologies as a Universal Asynchronous Receiver/Transmitter (UART) multi-drop environment.

The serial communications bus protocol is designed for use in a master/slave environment. However, rather than used with a designated master and several slaves, the protocol is implemented in a small network type of environment where a same device can be a master through one communication cycle and then become a slave for another communication cycle.

A command is used by a master device to request action from a slave. The command packet, in one embodiment, has the structure shown in the table below:

TABLE 2

Serial Bus Protocol Command Packet Structure

| STX | Address | Packet Length | Command | Data | CRC | ETX |
|---|---|---|---|---|---|---|
| 1 byte | 1 byte | 1 byte | 1 byte | N bytes | 2 bytes | 1 byte |

Specifically, Start-of-Text (STX) is one byte with a value of 0x02, and to determine whether an STX is valid, the receiving control board determines whether an Acknowledge (ACK) byte follows STX. If the value 0x02 is in the middle of a transmission and not followed by ACK, the value should not be interpreted as an STX.

Address is one byte and each device connected to bus 112 has one effective address.

Packet length is the number of bytes in the packet including STX, Address, Packet Length, Command, Data, Cyclic-Redundancy Check (CRC), and End-of-Text (ETX). The packet length value is equivalent to 7+n, where n is the number of data bytes.

Command or request is one byte defined by the application layer.

Data may be zero, one, or multiple bytes as defined in the application layer, except for the case of a request in which the first data byte will be the master's address so the slave will know which device to respond to.

CRC is a 16-bit Cyclic-Redundancy Check, and ETX (End-of-Text) is one byte with a value of 0x03.

For each command packet sent, the CRC is computed on all bytes of the packet except the STX, the CRC byte pair and the ETX.

An exemplary command sequence is set forth in the following table.

TABLE 3

Serial Bus Protocol Command Sequence
Command Sequence

| Master | | Slave | |
|---|---|---|---|
| STX | [0x02] | | |
| Slave Address | 1 byte | [0x06] | ACK |
| Packet Length | 1 byte | [0x06] | ACK |
| Command | 1 byte | [0x06] | ACK |
| Data Byte 1 | 1 byte | [0x06] | ACK |
| Data Byte 2 | 1 byte | [0x06] | ACK |
| Data Byte n | 1 byte | [0x06] | ACK |
| CRC MSB | 1 byte | [0x06] | ACK |
| CRC LSB | 1 byte | [0x06] | ACK |
| ETX | [0x03] | [0x06] | ACK |
| | | [0x06] | ACK |

An exemplary serial bus communications protocol is therefore set forth in the tables above, and the protocol is shown with all ACKs in the sequence. At any point in the process where an ACK can be sent a Not-Acknowledge (NAK) may be sent instead. If a NAK is transmitted, the communication sequence is aborted at that point. The master then has the option of re-starting the sequence, depending on the application. A NAK is transmitted only in response to an overrun or framing error detected on, or in lieu of, a received byte or in response to a received ETX when the computed packet CRC does not match the transmitted packet CRC. An additional ACK is sent at the end of each packet.

In one embodiment, an ACK is one byte with a value of 0x06, and a NAK is one byte with a value of 0x15. In alternative embodiments, different codes are employed to identify an ACK and a NAK, respectively.

Exemplary bus protocol request and response sequences are set forth in the following tables.

TABLE 4

Serial Bus Protocol Request Sequence
Request Sequence

| Requestor | | Requestee | |
|---|---|---|---|
| STX | [0x02] | | |
| Request Address | 1 byte | [0x06] | ACK |
| Packet Length | 1 byte | [0x06] | ACK |
| Request Command | 1 byte | [0x06] | ACK |

TABLE 4-continued

Serial Bus Protocol Request Sequence
Request Sequence

| | Requestor | | Requestee | |
|---|---|---|---|---|
| Data Byte 1 Requestor's Address (Transmitter) | 1 byte | [0x06] | | ACK |
| Data Byte 2 | 1 byte | [0x06] | | ACK |
| Data Byte n | 1 byte | [0x06] | | ACK |
| CRC MSB | 1 byte | [0x06] | | ACK |
| CRC LSB | 1 byte | [0x06] | | ACK |
| ETX | [0x03] | [0x06] | | ACK |
| | | [0x06] | | ACK |

TABLE 5

Serial Bus Protocol Response Sequence
Response to Request Sequence

| | Requestee | | Requestor | |
|---|---|---|---|---|
| STX | [0x02] | | | |
| Requestor's Address | 1 byte | | [0x06] | ACK |
| Packet Length | 1 byte | | [0x06] | ACK |
| Command to which Requestee is Responding | 1 byte | | [0x06] | ACK |
| Data Byte 1 Requestee's Address (Transmitter) | 1 byte | | [0x06] | ACK |
| Data Byte 2 | 1 byte | | [0x06] | ACK |
| Data Byte n | 1 byte | | [0x06] | ACK |
| CRC MSB | 1 byte | | [0x06] | ACK |
| CRC LSB | 1 byte | | [0x06] | ACK |
| ETX | [0x03] | | [0x06] | ACK |
| | | | [0x06] | ACK |

The exemplary protocol set forth above assumes that time increments with each row of the tables. Up to 250 milliseconds of delay is tolerated for any expected event (row); an ACK response to a transmitted byte, or the reception of the next byte of an incomplete packet. For the request sequence and response to request sequence, the first data byte is the transmitter's address.

By assigning a unique address to each device connected to bus 112, peripheral control boards 108, 110 (shown in FIG. 1) can communicate with one another within appliance 102 (shown in FIG. 1), appliance communication controller 104 can communication with appliance main controller 106.

In addition, in an exemplary embodiment, a version number request and a version number reply are incorporated into the protocol application layer, which is organized by printed wire assembly. Factory and service equipment can thus verify the version number and product type of each associated device for each appliance. A version number request command is shown below.

TABLE 6

Serial Bus Protocol Version Number Request Command

| Request Command | Value |
|---|---|
| Version Number Request | 0x01 |

The Version Number Request includes one data byte, which is the requestor's address. This enables the receiver to respond to the correct device. As will become evident below, this also enables appliance communication controller 104 to automatically detect the presence of appliance 102 and to configure itself accordingly for communication with appliance 102.

A Version Number Reply includes a number of data bytes not exceeding a predetermined maximum limit. In one embodiment, the Version Number Reply includes four data bytes. The first data byte is the requestee's address. The requestor then knows which device is replying. The second data byte is the product identifier (specified in the product application layer). The next two data bytes are the encoded version number. In alternative embodiments, the Version Number Reply includes greater or fewer than four data bytes.

Thus, using the exemplary serial bus communications protocol set forth above, appliance main controller 106 can effectively communicate with peripheral boards 108, 110 and also with appliance communications controller 104. The foregoing protocol is but one implementation of an interprocessor communication scheme, and it is recognized that other bytes, codes, constants, addresses, and other parameter values may be used in alternative embodiments.

Figure 3:
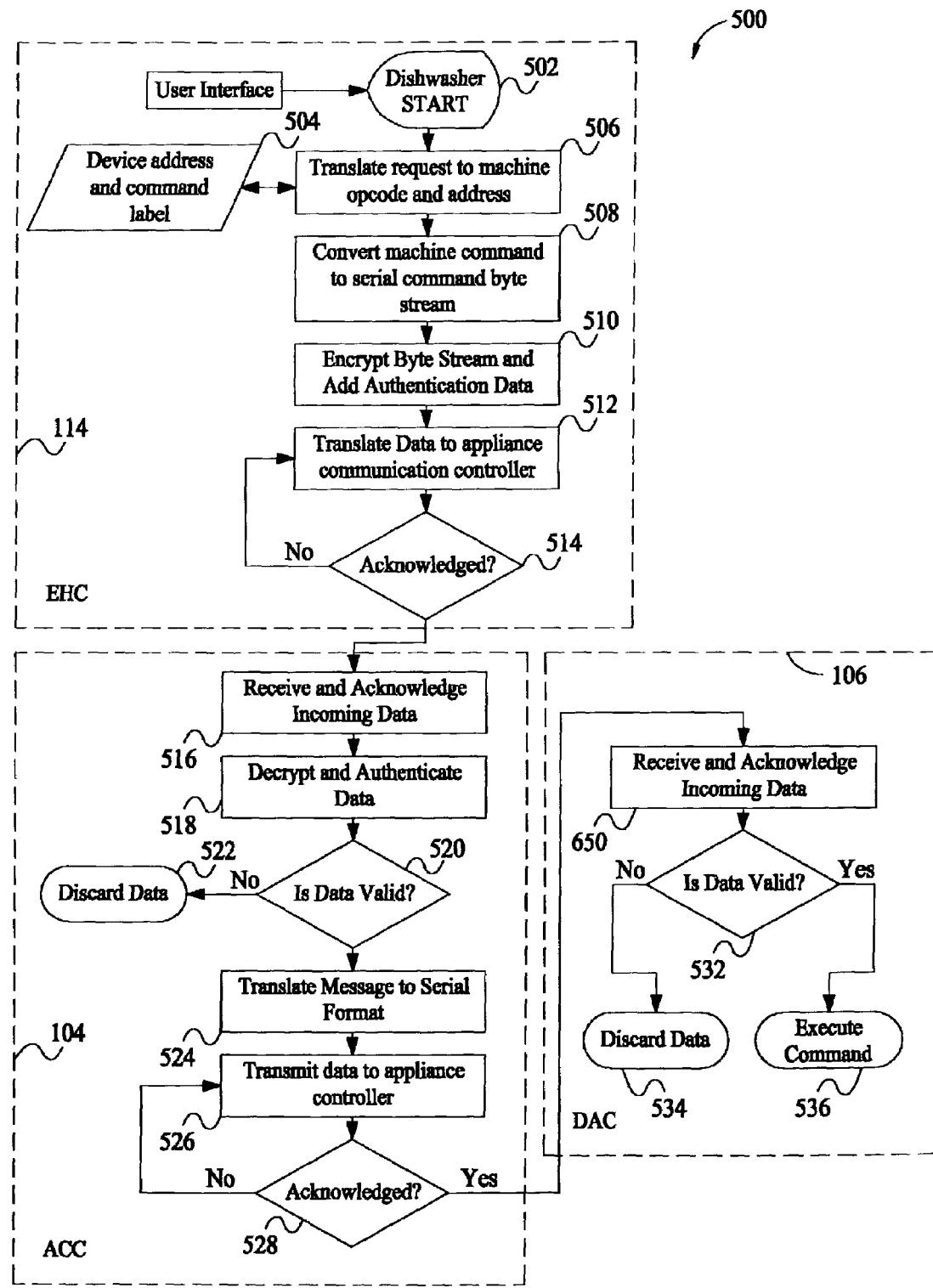
FIG. 3 is a method flow chart executable by the system shown in FIG. 1 for communicating between a power line carrier communication protocol and an appliance communication protocol.

FIG. 3 is a flow chart of a method 500 executable by appliance communications controller 104 (shown in FIGS. 1 and 2) and more specifically, communications processor 245, for translating between power line carrier communication protocol and the serial bus communication protocol (described above) for appliance 102. In an illustrative embodiment, a user runs an application on external host controller 114 (shown in FIG. 1) which has been developed to manipulate appliance 102. In an alternative embodiment, the user application is run on a remote system which has a communication link to external host controller 104. When the user selects 502 an appropriate command for appliance 102, such as Dishwasher START using external host controller 114, controller 114, through its application program, interprets the request and obtains the machine specific command from a device information table 504. Once the appropriate command has been obtained 506 from table 504, external host controller 114 generates 508 a message packet including the applicable machine command and device address. External host controller 114 further authenticates and encrypts 510 the data prior to transmission of the packet to appliance communication controller 104.

External host controller 114 converts the encrypted data to electrical signals and transmits 512 the electrical signals via carrier network 101 (shown in FIG. 1). External host controller 114 monitors transmission of the data packet to appliance communication controller 104 and checks 514 for an acknowledgment that the data has been received correctly by appliances communication controller 104. If the acknowledgment is not received in a specified time frame according to the serial bus communication protocol, the data will be retransmitted by external host controller 114.

Appliances communications controller 104 accepts and acknowledges the incoming data transmission from external host controller 114. Thus, appliance communication controller 104 converts 516 the received electrical signals back to a logical data packet. Appliance communication controller 104 employs selected algorithms to decrypt and authenticate 518 the received data packet. In circumstances where communication interface 120 is not able to authenticate 518 the data packet, or finds 520 the packet to be invalid, the data packet is discarded 522 and a request for retransmission is sent to external host controller through network carrier 101. Following a successful authentication of a data packet by appliance communication controller 104, appliance communication controller 104 will reformat 524 the data for serial transmission. The data is converted to electrical signals and transmitted 526 via bus 112 (shown in FIG. 1). Appliance communication controller 104 monitors 528 transmission of the data packet to appliance main controller 106 (shown in FIG. 1) and monitors for acknowledgement of the data being received correctly.

At the receiving end of the communication line, appliance control 106 converts the electrical signals from appliance communication controller 104 to logical information. Once appliance controller 104 accepts 530 the logical signals and confirms 532 the validity of the data, and acknowledgement is transmitted back to appliance communication controller 104 to complete the data exchange. Appliances controller 106 then interprets the data within the packet. If the packet contains a valid command then appliance controller 106 executes 534 the machine command accordingly. If the command is determined not to be valid then the request is discarded 536.

Using method 500 and the serial bus communications protocol, appliance 102 can be monitored and controlled from external host controller 114. Control parameters and algorithms may be updated or modified using external host controller 104, and appliance diagnostic functions may be executed.

Figure 4:
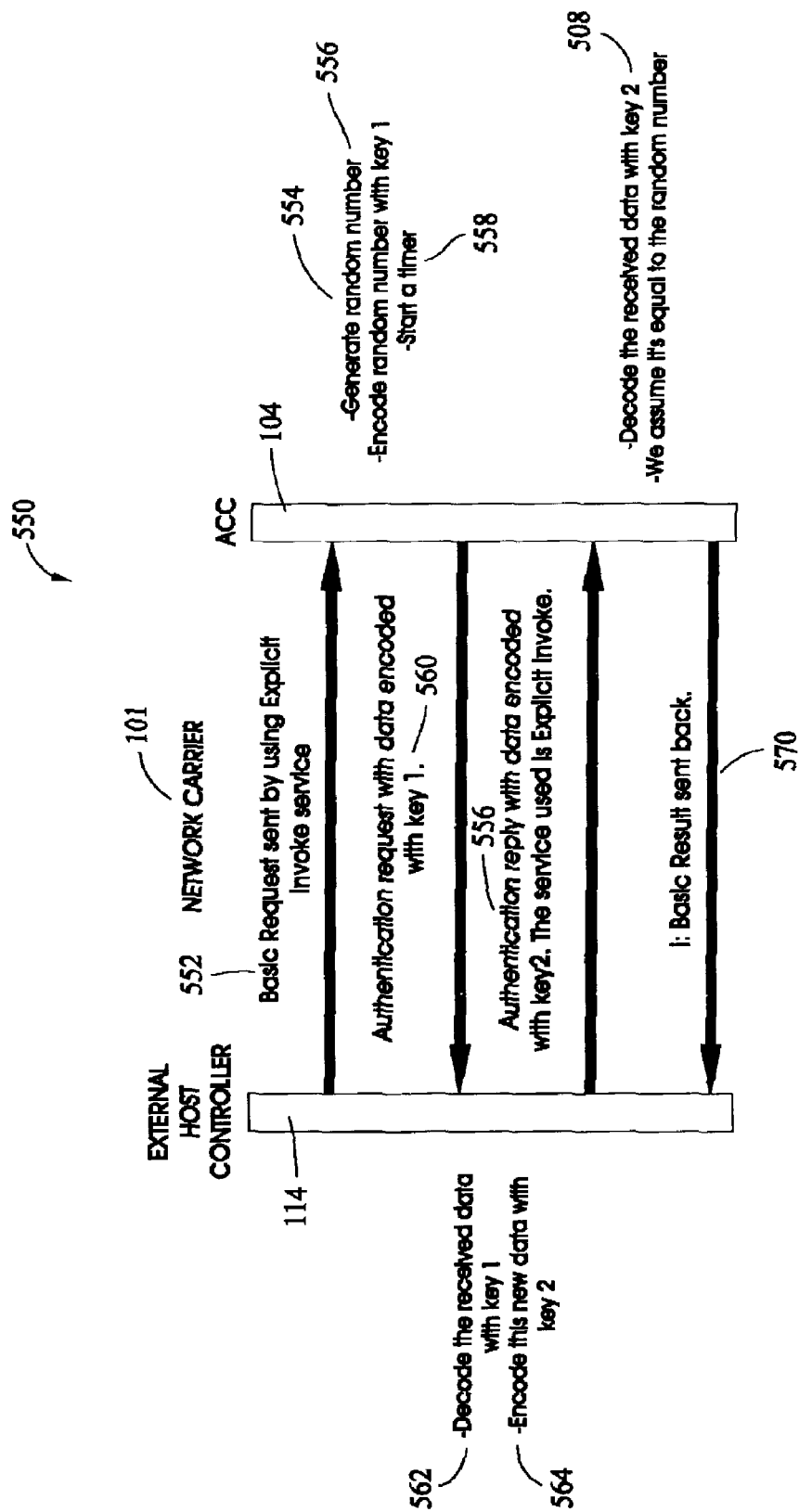
FIG. 4 is a method flow chart of an authentication algorithm executable by the system shown in FIG. 1.

FIG. 4 is a method flow chart of an authentication algorithm 550 executable by the system shown in FIG. 1. In an exemplary embodiment, method 550 is implemented using commercially available software, such as CEBox™ software commercially available from Domosys Corporation of Quebec City, Canada. The CEBox™ software includes CELib™ protocol libraries and a number of interface functions for CEBus product implementation to allow interconnected devices to communicate through a Common Application Language (CAL) It is understood, however, that the methodology described below could be implemented in various other software schemes and packages familiar to and appreciated by those in the art.

As will become evident, algorithm 550 is a two-way authentication algorithm using bi-directional communication between appliance communication controller 104 and an external host controller 114 through, for example, network carrier 101 (shown in FIG. 1). Algorithm 550 employs multiple encoding keys and an encryption algorithm that, in combination, is believed to substantially minimize vulnerability of appliance communications controller 104 to unauthorized instructions and use by malicious computer hackers.

Algorithm 550 begins when a request is sent 552 to appliances communication controller 104 from an external controller 114 through network carrier 101. In an exemplary embodiment, the request is sent 552 using an Explicit_Invoke service of the CEBox™ software that transmits a request package. In response to the sent request, appliances communications controller 104 generates 554 a random number, encodes 556 the random number with a first encryption key, and starts 558 a timer. The encoded random number data is sent 560 to the external controller 114 through network carrier 101 as an authentication request. If the external host controller 114 is able to respond or reply to the authentication request in a predetermined manner and within a predetermined time the originally sent request 552 is considered valid and will be answered or executed by appliance communications controller 104. If the external controller 114 does not respond to the authentication request in the predetermined manner or does not respond within the predetermined amount of time, the originally sent request is considered invalid and ignored by appliance communications controller 104.

Assuming that the external host controller 114 is equipped to properly respond to the authentication request, once the encoded random number data is received by external controller 114, the external controller 114 decodes 562 the received data with the first encryption key, and encodes 564 the decoded value with a second encryption key. An authentication reply is then sent 566 from external controller 114 to appliance communications controller 104 through network carrier 101, such as via the Explicit_Invoke service of the CEBox™ software.

When the authentication reply is received by appliance communication controller 104, the reply is decoded 568 with the second encryption key. If the decoded reply matches the random number generated 554 by the appliance communications controller 104, appliance communication controller 104 answers 570 the original request or executes a command in accordance with the request.

If the appliance communications controller does not receive a reply or if a reply does not match the random number generated 554, the original request is ignored.

In an exemplary embodiment, the authentication reply must be received within 750 ms according to the timer started in step 558. Unless the external host controller 114 and appliance communications controller share the predetermined first and second encryption keys to quickly encode and decode the random number, it is unlikely that the authentication request can be correctly and timely answered to establish communication with appliances communications controller, thereby denying access to unauthorized and potentially malicious users. Also in an exemplary embodiment, data values are encoded and decoded according to the Skipjack encryption algorithm which has been declassified by the United States Department of Defense. Information on the Skipjack algorithm is available from the National Institute of Standards and Technology (NIST), Computer Security Division, an agency of the United States Commerce Department's Technology Administration.

Figure 5:
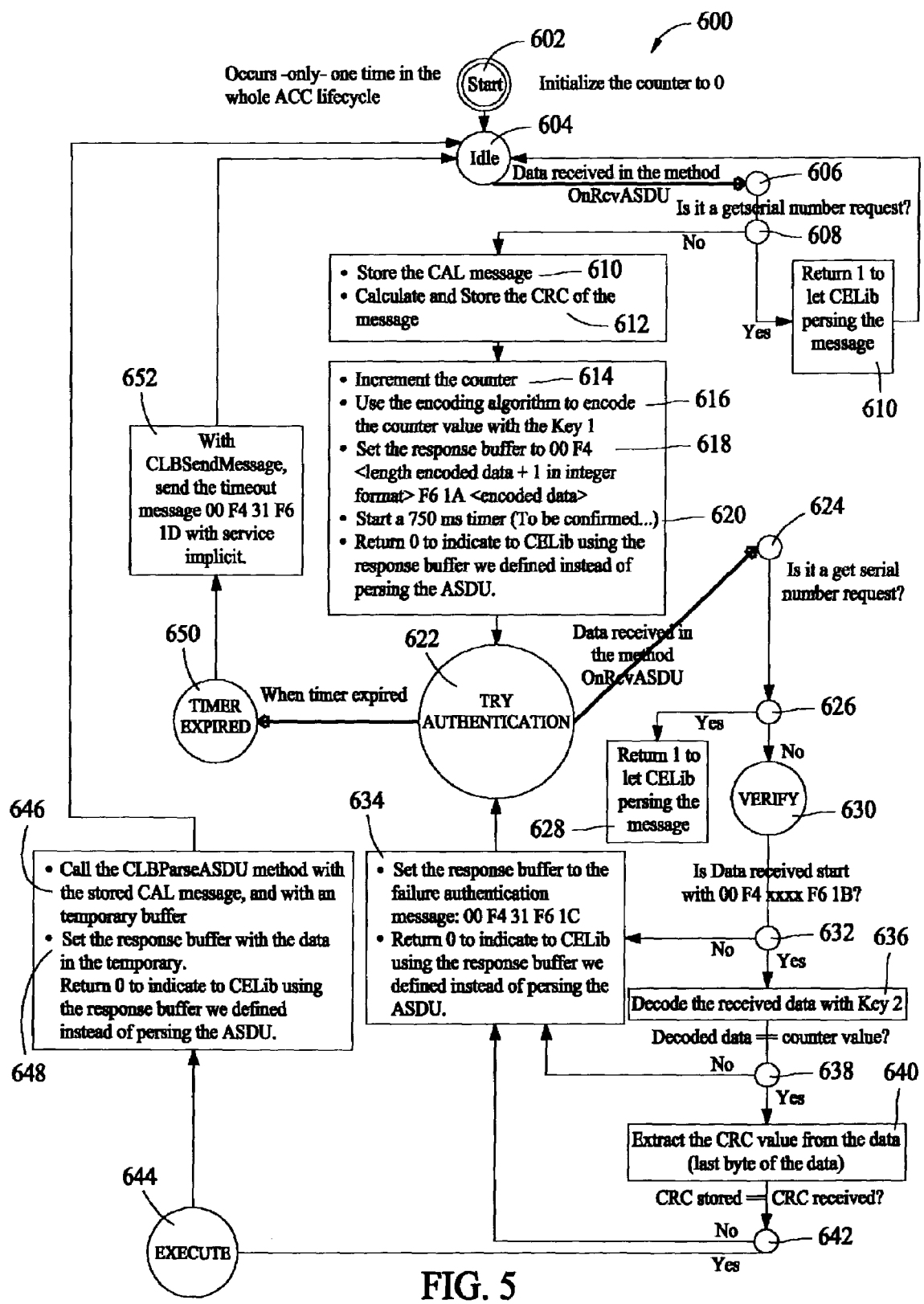
FIG. 5 is an authentication state machine for the system shown in FIG. 1.

FIG. 5 is an authentication state machine 600 for appliance communication controller 104 illustrating the above-describe algorithm 550 (shown in FIG. 4) in greater detail. State machine 600, in an exemplary embodiment, is implemented using commercially available software, such as CEBox™ software commercially available from Domosys Corporation of Quebec City, Canada. The CEBox™ software includes CELib™ protocol libraries and a number of interface functions for CEBus product implementation, as well as facilitates creation of user-defined Application Protocol Data Unit (APDU) services to customize the software scheme It is understood, however, that the methodology described below could be implemented in various other software schemes and packages familiar to and appreciated by those in the art.

For authentication state machine 600, user defined APDU services in an exemplary embodiment include the following:

TABLE 7

Authentication APDU Services

| Message Name | Sent By | Message Code | User-Defined Message | Description |
|---|---|---|---|---|
| Authentication Request | Appliance Communication Controller | 0x1A | 00 F4 xxxx 1A | Sent to Initiate Authentication Process |
| Authentication Reply | External Host Controller | 0x1B | 00 F4 xxxx 1B | Sent to Validate Authentication Request |
| Authentication Failure | Appliance Communication Controller | 0x1C | 00 F4 31 F6 1C | Sent Each Time An Authentication Request Is Not Valid |
| Authentication Timeout | Appliance Communication Controller | 0x1D | 00 F4 31 F6 1D | Sent When the Waiting for Valid Authentication Reply Timer Expires |

These exemplary APDU services are called and recognized by appliances communications controller 104 as set forth below. The xxxx designation denotes variable encoded values used in the authentication process. It is recognized, of course, that other message formats may be employed in various alternative embodiments without departing from the scope of the present invention.

When appliance communications controller 104 is started or initialized 602, an authentication counter is set to zero in the software. As will be seen below, the authentication counter is used as an authentication value and is incremented as appliance communications controller 104 operates and interacts with external sources, such as external controller 114 (shown in FIG. 4). Therefore, at any given time, the value of the authentication counter for practical purposes may be considered a random number for the authentication process set forth below. It is contemplated, however, that in alternative embodiments the authentication value may be determined otherwise, including but not limited to use of a random number generator. In still further alternative embodiments, the authentication value may include more than one element in combination, including but not limited to combinations of numbers, letters, symbols, etc.

After appliance communications controller 104 is initialized 602, an idle state 604 is entered until a data message is received 606 through network carrier 101 (shown in FIG. 4) with a Common Application Language (CAL) format. In an exemplary embodiment, the OnRcvASDU function of the CEBox™ software is invoked as data is received.

Once the data message is received 606, appliance communications controller 104 determines 608 whether the data message is a request for the serial number of controller 104. If the request is a request for serial number, appliance communications controller 104 answers 610 the request and returns to the idle state 604. Thus, in an illustrative embodiment a request for serial number bypasses authentication procedures and is simply answered.

If the received data message 606 is not a request for serial number, the authentication process is entered. In preparation for an authentication request, the received CAL message is stored 610 and a cyclic redundancy check (CRC) of the CAL message is calculated 612 for further use. The authentication counter value is incremented 614, and the incremented counter value is encoded 616 using a first encryption key. A response buffer is set 618 for sending an authentication request, such as via user defined Authentication Request APDU set forth above in Table 7. The Authentication request includes the encoded counter value, and an authentication timer is started 620 after the Authentication Request is sent. In an exemplary embodiment, the authentication timer is set for 750 ms, although it is appreciated that greater or lesser values for the authentication timer may be employed in alternative embodiments without departing from the scope of the present invention.

Once the authentication timer is set 620, appliance communication controller waits 622 for a reply to the sent Authentication Request. If another CAL data message is received 624 through network carrier 101 before the time has expired, appliance communications controller 104 again determines 626 whether the received request is a request for serial number. If it is determined 626 that the received CAL message is a serial number request, controller 104 answers 628 the request and continues to wait 622 for an authentication reply.

If it is determined that the received CAL request is not a serial number request, appliance communications controller verifies 630 the received request to determine 632 whether the received CAL request is in the proper format for an Authentication Reply as set forth above in Table 7. If the received CAL request is not in the proper format, a response buffer is set 634 to send an Authentication Failure message in the format set forth above in Table 7. After the Authentication Failure message is sent, appliance communication controller awaits 622 another response.

If it is determined that the received CAL request is in the proper format for an Authentication Reply, appliance communications controller decodes 636 the received data with the second encryption key. After decoding 636 the data, the decoded data is compared 638 to the authentication counter value 614 that was encoded 616 in the Authentication Request. If the decoded value does not equal the counter value, a response buffer is set 634 to send an Authentication Failure message in the format set forth above in Table 7. After the Authentication Failure message is sent, appliance communication controller awaits 622 another response.

If the decoded data value from the received CAL request 624 matches the counter value 614, a CRC value of the CAL request, generated by the external host controller that sent the CAL request, is extracted 640 from the received CAL request. The extracted CRC value is then compared 642 to the stored CRC 612 calculated for the received CAL request 606. If the stored CRC 612 does not match the extracted CRC 640 from the CAL request 624, a response buffer is set 634 to send an Authentication Failure message in the format set forth above in Table 7. After the Authentication Failure message is sent, appliance communication controller awaits 622 another response.

If the stored CRC 612 does match the CRC received and extracted 640 from the CAL request 610, the authentication is successful and appliance communications controller 104 prepares to executes 644 the CAL request by parsing 646 the message and responding 648 appropriately. After responding to the CAL request or instruction, appliance communications controller 104 returns to the idle state 604.

If the authentication timer expires 650 before a successful authentication occurs, the Authentication Timeout message as set forth above in Table 7 is sent 652, and appliance communications controller 104 returns to the idle state 604. Once in the idle state, controller 104 remains in the idle state until another CAL data package is received 606. Thus, if an Authentication Failure or Authentication Timeout occurs, the external host controller 114 may re-send a CAL request and once again attempt to authenticate the request to establish communication with appliance communications controller 104.

It is believed that those in the art of electronic controllers could program appliance communications controller 104 to execute the above-described authentication scheme without further explanation to provide a secure barrier to unauthorized communication and/or interception of communicated data to and from appliance communication controller 104.

While the invention has been described in terms of various specific embodiments, those skilled in the art will recognize that the invention can be practiced with modification within the spirit and scope of the claims.

What is claimed is:

1. An authentication method for communication between a first device and a second device over a network carrier, said authentication method comprising:
    determining whether a message from the second device is in a proper format for authentication;
    encoding, in response to the message from the second device, a first authentication value upon receipt of the message, the first authentication value encoded with a first encryption key;
    calculating a first cyclic redundancy check value of the message upon receipt of the message;
    sending the encoded first authentication value to the second device;
    decoding, in response to a reply from the second device, a second authentication value upon receipt of the reply if the reply is received within a predetermined time after sending the encoded first authentication value, the second authentication value decoded with a second encryption key;
    comparing the first and second authentication values to determine the authenticity of the reply;
    extracting a second cyclic redundancy check value from the reply; and
    comparing the second cyclic redundancy check value from the reply against the first cyclic redundancy check value of the message.

2. An authentication method in accordance with claim 1 further comprising randomly generating the first authentication value.

3. An authentication method for an appliance communication controller in communication with an external host controller, said authentication method comprising:
    determining whether a first message from the external host controller is in a proper format for authentication;
    encoding a first authentication counter value upon receipt of the first message from the external host controller, the first authentication counter value encoded with a first encryption key;
    calculating a first cyclic redundancy check value of the first message upon receipt of the first message;
    sending the encoded first authentication counter value to the external host controller;
    decoding a second authentication counter value upon receipt of a second message from the external host controller, the second authentication counter value decoded with a second encryption key;
    sending an authentication timeout message if the second message is not received within a predetermined time;
    comparing the first and second authentication counter values;
    ignoring the first message if the first and second authentication counter values do not match;
    extracting a second cyclic redundancy check value from the second message;
    comparing the cyclic redundancy check value from the second message against the first cyclic redundancy check value of the first message; and
    responding to the first message if the cyclic redundancy check value matches the stored cyclic redundancy check value.

4. An authentication method in accordance with claim 3 further comprising incrementing the first authentication counter value before encoding the first authentication counter value.

5. An authentication method in accordance with claim 3 further comprising sending an authentication failure message if the first and second authentication counter values do not match.

6. An authentication method in accordance with claim 5 further comprising:
    starting an authentication timer; and
    if the first and second authentication counter values do not match before the expiration of the authentication timer, sending an authentication failure message.

7. An authentication method for an appliance communication controller in communication with an external host controller through a network carrier, said authentication method comprising:
    determining whether a first message from the external host controller is in a proper format for authentication;
    maintaining an authentication counter value;
    calculating a first cyclic redundancy check value of the first message upon receipt of the first message from the external host controller;
    incrementing the authentication counter value in response to the first message from the external host controller;
    encoding the incremented authentication counter value with a first encryption key upon receipt of the first message from the external host controller;
    sending the encoded authentication counter value to the external host controller;
    decoding, with a second encryption key, a reply authentication counter value from the external host controller in response to the sent encoded authentication counter value if the reply authentication counter value is received within a predetermined time period;
    comparing the incremented and reply authentication counter values;

ignoring the first message if the incremented and reply authentication counter values do not match;

extracting a second cyclic redundancy check value from the reply authentication counter value;

comparing the second cyclic redundancy check value from the reply authentication counter against the first cyclic redundancy check value of the first message; and responding to the first message if the second cyclic redundancy check value matches the first cyclic redundancy check value.

8. An authentication method in accordance with claim 7 further comprising sending an authentication time out message to the external host controller if the reply authentication counter value is not received within the predetermined time period.

9. A controller comprising:
a processor;
a memory; and
a power line carrier transceiver operatively coupled to said processor, said processor programmed to determine whether a first message received by said power line carrier is in a proper format for authentication and execute a two-way authentication algorithm utilizing at least a first encryption key, a second encryption key, a first cyclic redundancy check value calculated from the first message, and a second cyclic redundancy check value extracted from a second message, to determine authenticity of messages received by said power line carrier transceiver, encode an authentication value and generate an authentication request, decode an authentication value from an authentication reply with said second encryption key, and generate an authentication timeout if the authentication reply is not received within a predetermined time.

10. A controller in accordance with claim 9 wherein said processor is programmed to:
compare the encoded authentication value with the decoded authentication value; and
respond to the authentication reply if the encoded authentication value matches the decoded authentication value.

11. An appliance communication controller comprising:
a processor;
a memory; and
a transceiver operatively coupled to said processor, said processor configured to:
determine whether an incoming message is in a proper format for authentication;
generate an authentication request in response to the incoming message through said transceiver and calculate a first cyclic redundancy check value of the incoming message, the authentication request comprising a first encoded authentication value encoded with a first encryption key;
receive an authentication reply within a predetermined time period after generating the authentication request;
decode the authentication reply received in response to the authentication request, the authentication reply comprising a second encoded authentication value decoded by an external controller with a second encryption key; and
based upon the decoded reply, respond to or ignore the incoming message, said processor configured to extract a second cyclic redundancy check value from the authentication reply.

12. An appliance communication controller comprising:
a processor;
a memory; and
a power line carrier transceiver operatively coupled to said processor, said processor configured to:
determine whether an incoming message is in a proper format for authentication;
generate an authentication request in response to the incoming message through said power line carrier transceiver and calculate a first cyclic redundancy check value of the incoming message, said authentication request comprising a first encoded authentication counter value encoded with a first encryption key;
decode an authentication reply with a second encryption key, when said authentication reply is received within a predetermined time period, said authentication reply comprising a second encoded authentication counter value;
compare the first authentication counter value with the second authentication counter value;
extract a second cyclic redundancy check value from said authentication replay;
compare the second cyclic redundancy check value from said authentication reply against the first cyclic redundancy check value of the incoming message; and
respond to the incoming message if said second cyclic redundancy check value from said authentication reply matches said first cyclic redundancy check value from the incoming message.

13. An appliance communication controller in accordance with claim 11 wherein said processor is configured to accept the authentication reply only within the predetermined time period after generating the authentication request.

* * * * *